(12) United States Patent
Watanabe

(10) Patent No.: US 8,348,638 B2
(45) Date of Patent: Jan. 8, 2013

(54) COMPRESSOR

(75) Inventor: Kiwamu Watanabe, Shiga (JP)

(73) Assignee: Panasonic Corporation, Osaka (JP)

( * ) Notice: Subject to any disclaimer, the term of this patent is extended or adjusted under 35 U.S.C. 154(b) by 422 days.

(21) Appl. No.: 12/516,298

(22) PCT Filed: Oct. 8, 2008

(86) PCT No.: PCT/JP2008/002835
§ 371 (c)(1),
(2), (4) Date: May 26, 2009

(87) PCT Pub. No.: WO2009/054099
PCT Pub. Date: Apr. 30, 2009

(65) Prior Publication Data
US 2010/0047093 A1   Feb. 25, 2010

(30) Foreign Application Priority Data

Oct. 25, 2007   (JP) .................. 2007-277332

(51) Int. Cl.
*F04B 35/04* (2006.01)
(52) U.S. Cl. ........................ 417/415; 417/437
(58) Field of Classification Search .......... 417/415, 417/410.1, 902, 437, 321
See application file for complete search history.

(56) References Cited

U.S. PATENT DOCUMENTS

| | | |
|---|---|---|
| 1,435,167 A | 7/1920 | Loeffler |
| 4,266,913 A | 5/1981 | Nomura |
| 4,357,058 A | 11/1982 | Sonnerat |
| 4,632,644 A | 12/1986 | Fritchman |
| 5,964,582 A * | 10/1999 | Kobayashi et al. ...... 417/423.12 |
| 2005/0008502 A1 | 1/2005 | Manke et al. |
| 2005/0089416 A1 | 4/2005 | Lee |
| 2009/0136369 A1 | 5/2009 | Kakiuchi et al. |

FOREIGN PATENT DOCUMENTS

| | | |
|---|---|---|
| JP | 53-130511 U | 10/1978 |
| WO | WO 2007/061103 A1 | 5/2007 |

OTHER PUBLICATIONS

PCT Written Opinion Mar. 17, 2009 (10 pages).

* cited by examiner

*Primary Examiner* — Anh Mai
*Assistant Examiner* — Elmito Breval
(74) *Attorney, Agent, or Firm* — Brinks Hofer Gilson & Lione

(57) ABSTRACT

A compressor has a hermetic container filled with a lubricant and accommodates an electric element provided with a stator and a rotor and a compressing element, wherein the compressing element includes a shaft, a cylinder block, a piston, a connection mechanism, a bearing, and a thrust ball bearing provided between the rotor and a bearing end surface as an end surface of the bearing, and wherein the thrust ball bearing includes a plurality of balls, a holder portion for holding the balls, upper and lower races disposed on and beneath the balls, a rotation regulation portion for regulating a rotation of the lower race, and a thrust surface provided at the bearing end surface so as to contact with a lower surface of the lower race.

11 Claims, 10 Drawing Sheets

COMPRESSOR

TECHNICAL FIELD

The present invention relates to a compressor used for a freezing device, a refrigerating device, and the like.

BACKGROUND ART

In recent years, regarding a compressor used for a freezing device such as a freezer or a refrigerator, it is required to obtain high efficiency for reducing power consumption, low noise, and high reliability.

In the past, this kind of compressor adopts a thrust ball bearing for the purpose of efficiency improvement so that a shaft is rotatable with respect to a main bearing (for example, see Patent Document 1).

Hereinafter, a general compressor will be described with reference to the drawings. FIG. 10 is a longitudinal sectional view showing a general compressor disclosed in Patent Document 1. A hermetic container 1 accommodates an electric element 2 including a stator 52 and a rotor 54 and a compressing element 4 rotationally driven by the electric element 2 while being disposed beneath the electric element 2, and a lubricant 6 is filled in a bottom portion thereof. The electric element 2 is integrally formed with the compressing element 4 to form a compression mechanism 8, and the compression mechanism 8 is elastically supported to the inside of the hermetic container 1 by a plurality of coil springs (not shown).

A cylindrical compression chamber 22 is formed in a cylinder block 20 forming the compressing element 4, and a piston 24 is fitted to the inside of the compression chamber 22 so as to reciprocate. A bearing 26 is fixed to the upper portion of the cylinder block 20, and a thrust surface 28 is formed on the bearing 26.

A shaft 30 includes a main shaft portion 34 axially supported to the bearing 26 in a vertical direction and having a spiral oil-feeding groove 32 formed in the outer periphery and an eccentric shaft portion 36 formed therebelow. The eccentric shaft portion 36 is connected to the piston 24 via a connection mechanism 44.

Additionally, a pipe-shaped oil filling pipe 42 is press-inserted into an oil-feeding hole (not shown) formed in a lower end 38 of the eccentric shaft portion 36 so that one end of the oil-feeding pipe 42 is communicated from the oil-feeding hole to the spiral oil-feeding groove 32.

The electric element 2 includes a stator 52 fixed to the upper portion of the cylinder block 20 and a rotor 54 fixed to the main shaft portion 34 of the shaft 30 by shrinkage fitting.

It is assembled so that a center position of a rotor iron core 53 of the rotor 54 is substantially identical with that of a stator iron core 51 of the stator 52 in a height direction.

Additionally, FIG. 11 is an enlarged view showing a main part of the general compressor. A thrust ball bearing 60 includes a plurality of balls 62, a holder portion 64 for holding the balls 62, and upper and lower races 66 and 68 disposed on and beneath the balls 62. The upper race 66 comes into contact with a bore plane 58 in a counter bore 56 as a concave portion of the rotor 54, and the lower race 68 comes into contact with the thrust surface 28 of the bearing 26. The plurality of balls 62 roll while coming into contact with the upper race 66 and the lower race 68.

Hereinafter, an operation of the compressor with the above-described configuration will be described.

When a current is supplied from an external power source to the electric element 2, the rotor 54 rotates. In accompany with the rotation, the shaft 30 rotates, rotation motion of the eccentric shaft 36 is transmitted to the piston 24 via the connection mechanism 44, and then the piston 24 reciprocates in the compression chamber 22, thereby enabling the compressing element 4 to perform a predetermined compression operation.

Accordingly, a refrigerant gas is sucked from a refrigeration system (not shown) into the compression chamber 22 to be compressed therein, and is again discharged to the refrigeration system.

At this time, the oil-feeding pipe 42 feeds the lubricant 6 by a centrifugal force so as to lubricate each slide movement portion (not shown), and a part of the lubricant is supplied from the spiral oil-feeding groove 32 to the thrust surface 28 so as to lubricate the thrust ball bearing 60.

The weight of the rotor 54 and the shaft 30 is supported by the thrust ball bearing 60. Since the ball 62 rolls between the upper race 66 and the lower race 68 upon rotating the shaft 30, a torque for rotating the shaft 30 becomes smaller than that of a thrust sliding bearing. For this reason, since it is possible to reduce a loss in the bearing, an input is reduced, thereby obtaining a high efficiency.

However, in the above-described general configuration example, a slide between the ball 62 and the lower race 68 forming the thrust ball bearing 60 or a slide between the lower race 68 and the thrust surface 28 of the bearing 26 coming into contact with the lower race 68 may cause an abrasion of the thrust surface 28 of the bearing 26, the ball 62, and the lower race 68.

Additionally, the abrasion of the thrust surface 28 of the bearing 26, the ball 62, and the lower race 68 may cause an increase of an input of the compressor to thereby deteriorate the efficiency or abrasion powder may be moved by each slide movement portion together with the lubricant 6 to thereby deteriorate the reliability.

[Patent Citation 1]
Japanese Patent Unexamined Publication No.Sho61-53474

DISCLOSURE OF INVENTION

According to an aspect of the invention, there is provided a compressor having a hermetic container filled with a lubricant and accommodating an electric element provided with a stator and a rotor and a compressing element driven by the electric element, wherein the compressing element includes a shaft provided with an eccentric shaft portion and a main shaft portion to which the rotor is fixed, a cylinder block provided with a compression chamber, a piston reciprocating in the compression chamber, a connection mechanism connecting the piston to the eccentric shaft portion, a bearing provided at the cylinder block to axially support the main shaft portion, and a thrust ball bearing provided between the rotor and a bearing end surface as an end surface of the bearing, and wherein the thrust ball bearing includes a plurality of balls, a holder portion for holding the balls, upper and lower races disposed on and beneath the balls, a rotation regulation portion for regulating a rotation of the lower race, and a thrust surface provided at the bearing end surface so as to contact with a lower surface of the lower race.

In the compressor with the above-described configuration, since the rotation of the lower race is prevented at the operation time, it is possible to prevent an abrasion caused by a slide between the lower race and the ball or a slide between the lower race and the bearing. Then, since the increase of the input or the abrasion is restricted in a contact portion between the lower race and the ball and a contact portion between the

EXPLANATION OF REFERENCE 101, 201: HERMETIC CONTAINER
102, 202: ELECTRIC ELEMENT
104, 204: COMPRESSING ELEMENT
106, 206: LUBRICANT
120, 220: CYLINDER BLOCK
122, 222: COMPRESSION CHAMBER
124, 224: PISTON
126, 226: BEARING
130, 230: SHAFT
134, 234: MAIN SHAFT PORTION
136, 236: ECCENTRIC SHAFT PORTION
144, 244: CONNECTION MECHANISM
152, 252: STATOR
154, 254: ROTOR
160, 260: THRUST BALL BEARING
162, 262: BALL
164, 264: HOLDER PORTION
166, 266: UPPER RACE
168, 268: LOWER RACE
180, 280: BEARING END SURFACE
182: OUTER PERIPHERAL WALL
184, 284: THRUST SURFACE
186: BEARING NOTCH PORTION
188: PROCESSING TOLERANCE PORTION
190: LOWER-RACE PROTRUSION PORTION
286a, 286b, 286c: BEARING PROTRUSION PORTION
290a, 290b, 290c: LOWER-RACE NOTCH PORTION

BEST MODE FOR CARRYING OUT THE INVENTION

Figure 1:
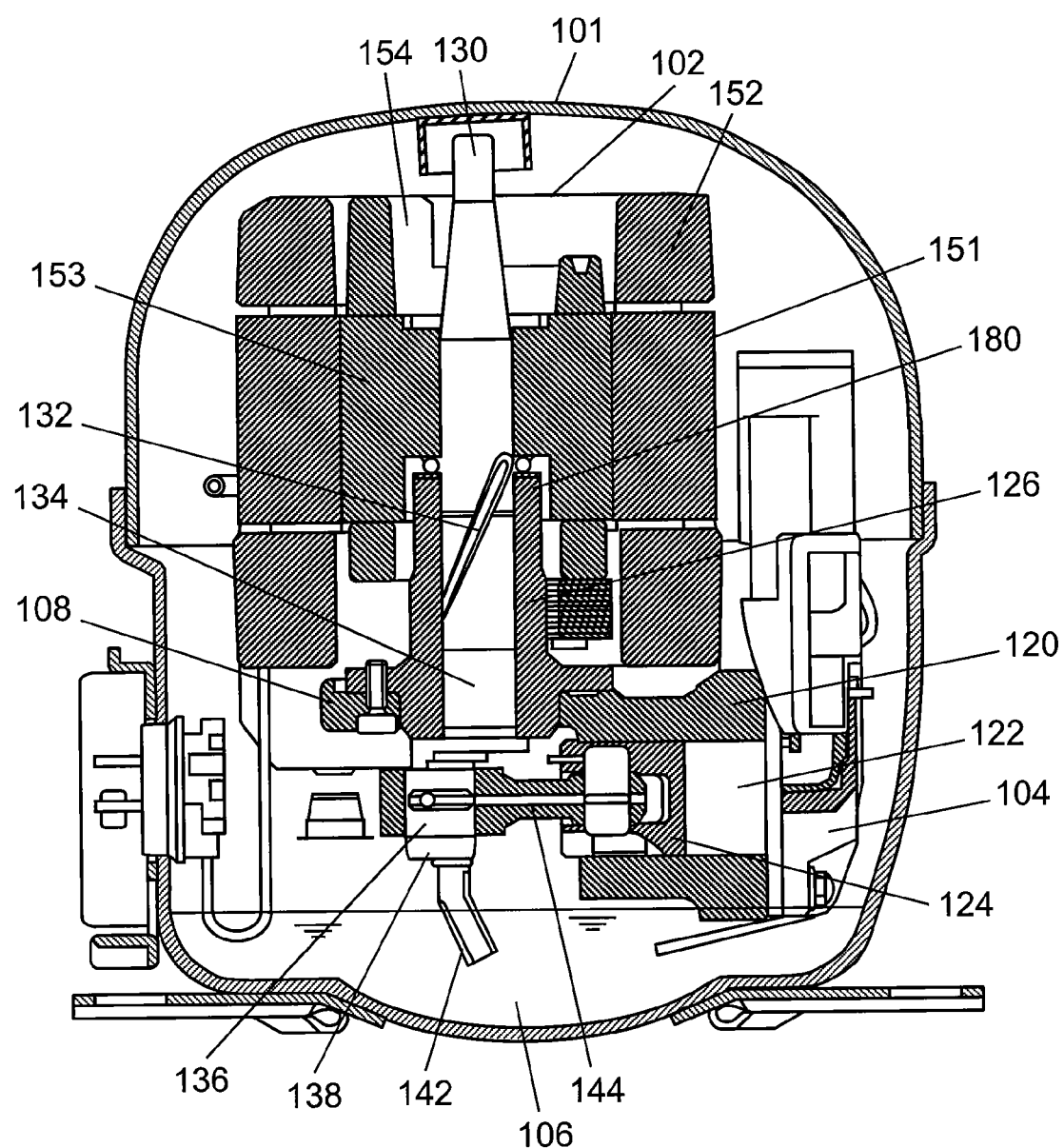
FIG. 1 is a longitudinal sectional view showing a compressor according to a first embodiment of the invention.

Hereinafter, exemplary embodiments of the invention will be described with reference to the accompanying drawings. Additionally, the invention is not limited to the embodiments.
First Embodiment FIG. 1 is a longitudinal sectional view showing a compressor according to a first embodiment of the invention. A hermetic container 101 accommodates an electric element 102 including a stator 152 and a rotor 154 and a compressing element 104 rotationally driven by the electric element 102 while being disposed below the electric element 102, and a lubricant 106 is filled in a bottom portion thereof. The electric element 102 is integrally formed with the compressing element 104 to form a compression mechanism 108, and the compression mechanism 108 is elastically supported to the inside of the hermetic container 101 by a plurality of coil springs (not shown).

The compressing element 104 includes at least a shaft 130, a cylinder block 120, a piston 124, a connection mechanism 144, a bearing 126, and a thrust ball bearing 160. A cylindrical compression chamber 122 is formed in the cylinder block 120 so that the piston 124 reciprocates in the compression chamber 122.

The shaft 130 includes a main shaft portion 134 axially supported to the bearing 126 in a vertical direction and having a spiral oil-feeding groove 132 formed in the outer periphery and an eccentric shaft portion 136 formed therebelow. Here, the shaft 130 includes the main shaft portion 134 to which the eccentric shaft portion 136 and the rotor 154 are fixed. Additionally, the bearing 126 is provided in the cylinder block 120 so as to axially support the main shaft portion 134. The eccentric shaft portion 136 is connected to the piston 124 via the connection mechanism 144.

Additionally, a pipe-shaped oil-feeding pipe 142 is press-inserted into an oil-feeding hole (not shown) formed in a lower end 138 of the eccentric shaft portion 136 so that one end of the oil-feeding pipe 142 is communicated from the oil-feeding hole to the spiral oil-feeding groove 132.

The electric element 102 includes the stator 152 fixed to the upper portion of the cylinder block 120 and the rotor 154 fixed to the main shaft portion 134 of the shaft 130 by shrinkage fitting.

It is assembled so that a center position of a rotor iron core 153 of the rotor 154 is substantially identical with that of a stator iron core 151 of the stator 152 in a height direction.

Figure 2:
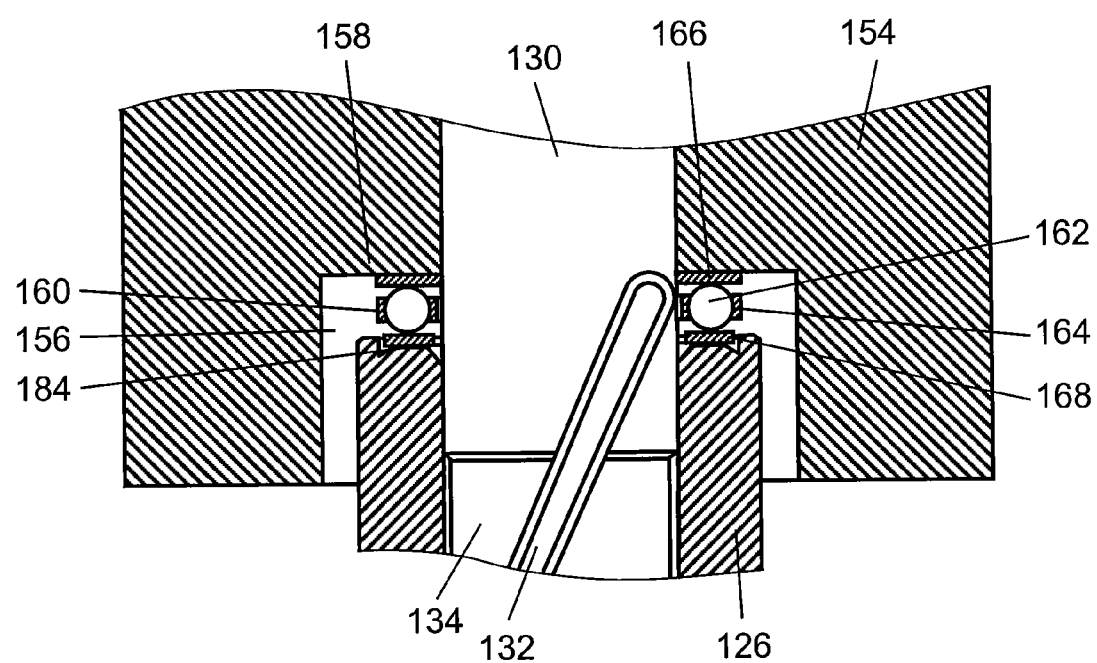
FIG. 2 is an enlarged view showing a main part of the compressor.

FIG. 2 is an enlarged view showing a main part of the compressor according to the first embodiment of the invention. A thrust ball bearing 160 is disposed between a thrust surface 184 and a bore plane 158 in a counter bore 156 as a concave portion of the rotor 154 in order to support the self weight of the shaft 130 or the rotor 154. That is, the thrust ball bearing 160 is provided between the rotor 154 and a bearing end surface 180 as an end surface of the bearing 126.

The thrust ball bearing 160 includes a plurality of balls 162, a holder portion 164 for holding the balls 162, upper and lower races 166 and 168 disposed on and beneath the balls 162, and a rotation regulation portion for regulating a rotation of the lower race 168. The upper race 166 comes into contact with the bore plane 158 of the rotor 154 and the lower surface of the lower race 168 comes into contact with the thrust surface 184 of the bearing end surface 180.

Each ball 162 is made from bearing steel having a high abrasion resistance property in terms of carbonizing, and a surface hardness is in the range of HRC 60 to 70. Additionally, the upper race 166 and the lower race 168 each has a surface hardness larger than that of an aluminum casting forming the bearing 126 or an electromagnetic steel plate forming the rotor 154, and are made from carbon steel having a high abrasion resistance property and subjected to a heat treatment. Then, it is manufactured so that a surface hardness is in the range of HRC 58 to 68 in terms of carbonizing or the like.

Additionally, a rolling surface coming into contact with the ball 162 is not more than 30 micron in a flatness degree. A surface hardness of the ball 162 is set to be slightly larger than that of the upper race 166 and the lower race 168.

Figure 3:
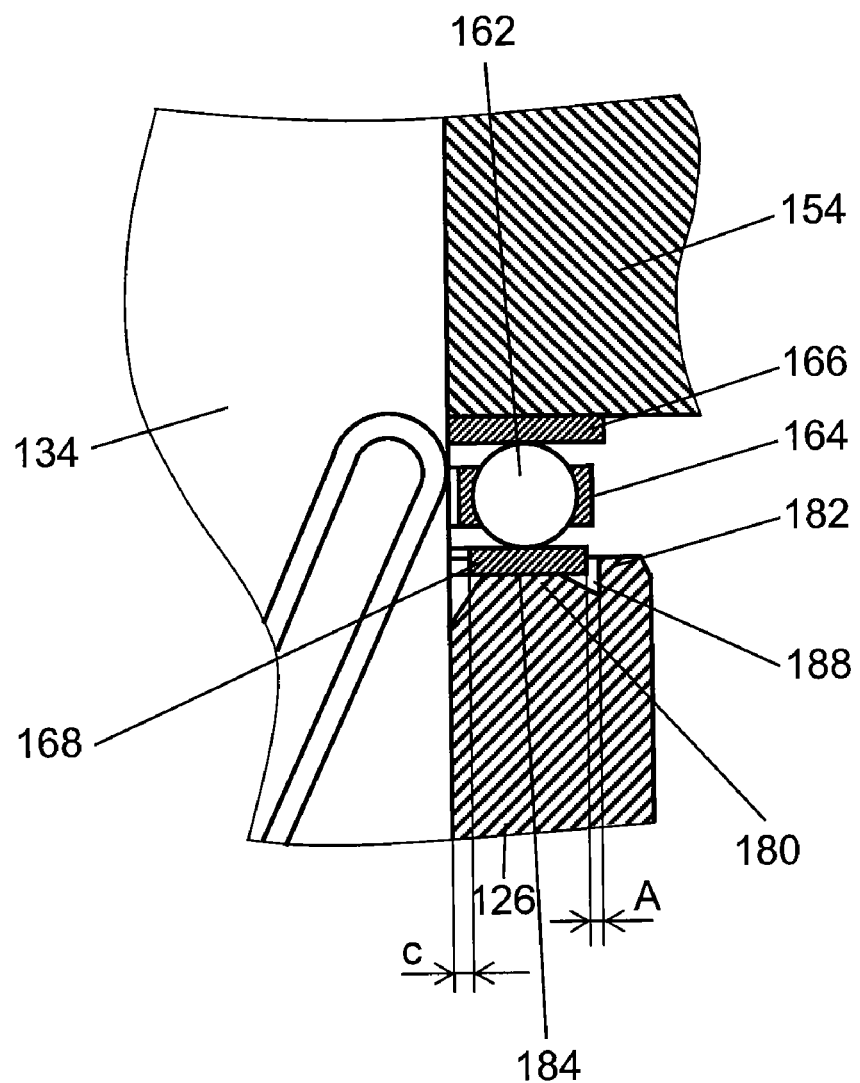
FIG. 3 is an enlarged view showing a main part of the compressor.

FIG. 3 is an enlarged view showing a main part of the compressor according to the first embodiment of the invention. The bearing 126 is fixed to the upper portion of the cylinder block 120. The bearing end surface 180 on the bearing 126 is provided with an outer peripheral wall 182 formed in the outer periphery of the bearing 126 so as to regulate the lower race 168 from moving in an outer-peripheral direction and a thrust surface 184 coming into contact with the lower surface of the lower race 168. Additionally, the thrust surface 184 is formed in a direction perpendicular to the outer peripheral wall 182.

A height of the outer peripheral wall 182 with respect to the thrust surface 184 is lower than a plate thickness of the disposed lower race 168 and is not less than a half of the plate thickness of the lower race 168. A clearance A between an inner diameter of the outer peripheral wall 182 and an outer diameter of the lower race 168 is set to be smaller than a clearance c between an inner diameter of the lower race 168 and an outer diameter of the main shaft portion 134.

Figure 4:
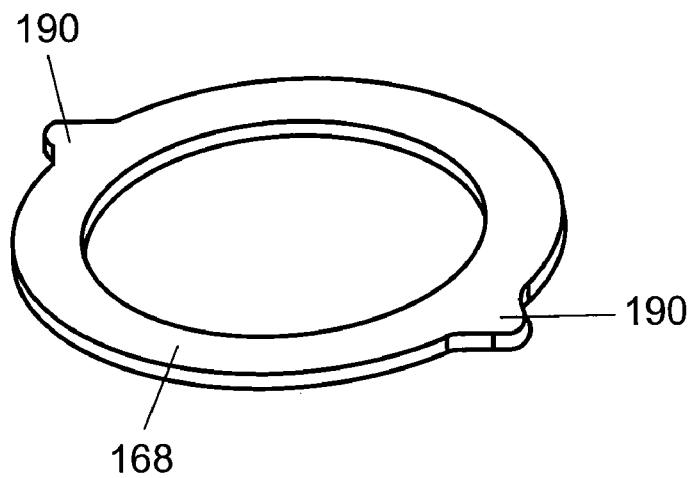
FIG. 4 is a perspective view showing a lower race of the compressor.

The lower race 168 is formed so that its lower surface comes into contact with the thrust surface 184 of the bearing end surface 180. Then, as shown in FIG. 4 as a perspective view showing the lower race of the compressor according to the first embodiment of the invention, a plurality of lower-race protrusion portions 190 is provided so as to protrude outward from the outer peripheral portion of the lower race 168. Additionally, the bearing end surface 180 of the bearing 126 is provided with a bearing notch portion 186 to which the lower-race protrusion portions 190 are locked.

Figure 5:
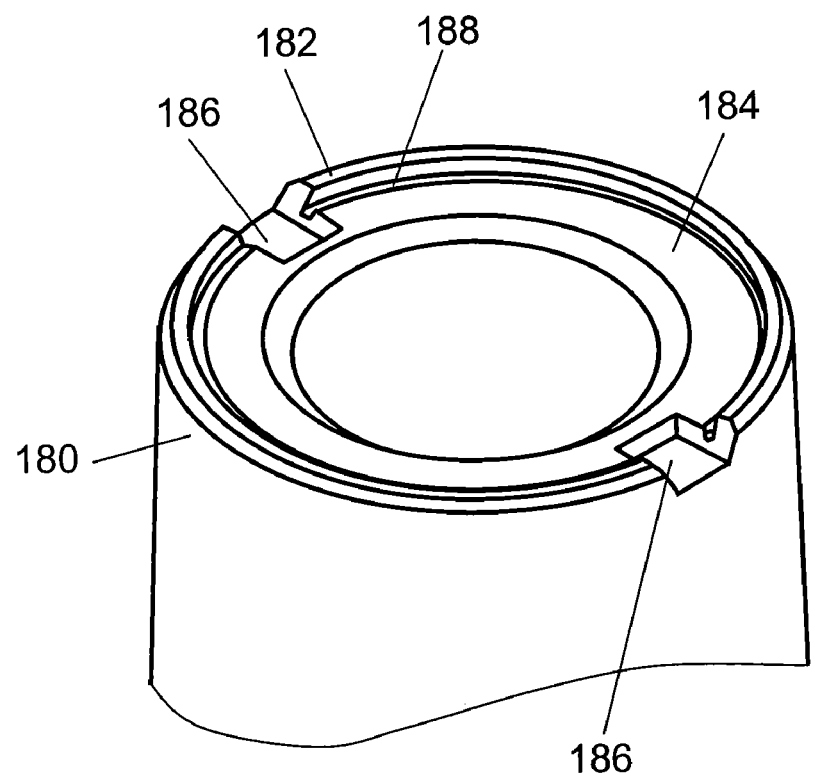
FIG. 5 is an enlarged view showing a bearing notch portion of the compressor.

FIG. 5 is an enlarged view showing a bearing notch portion of the compressor according to the first embodiment. The bearing end surface 180 is provided with the bearing notch portion 186 so as to penetrate the outer peripheral wall 182 and the thrust surface 184.

The bearing notch portion 186 is formed by processing or die-casting, and is formed on the outer-peripheral side of the bearing end surface 180, in which a lubricant fed by the oil-feeding groove 132 cannot flow to the outside, and to be deeper than the thrust surface 184. That is, the bearing notch portion 186 does not communicate with the inner peripheral portion of the bearing 126.

The outer peripheral end of the thrust surface 184 is provided with a processing tolerance portion 188 which is formed into an inclined surface inclined in a direction away from the thrust surface 184 or an inclined curve-surface shape at the same time when the thrust surface 184 is processed. Then, the lower-race protrusion portion 190 and the bearing notch portion 186 form a rotation regulation portion for regulating a rotation of the lower race 168.

Hereinafter, an operation and effect of the compressor with the above-described configuration will be described.

When a current is supplied from an external power source (not shown) to the electric element 102 shown in FIG. 1, the rotor 154 rotates. Subsequently, the shaft 130 rotates, rotation motion of the eccentric shaft portion 136 is transmitted to the piston 124 via the connection mechanism 144, and then the piston 124 reciprocates in the compression chamber 122, thereby enabling the compressing element 104 to perform a predetermined compression operation.

Accordingly, a refrigerant gas is sucked from a refrigeration system (not shown) into the compression chamber 122 to be compressed therein, and is again discharged to the refrigeration system.

At this time, the oil-feeding pipe 142 feeds the lubricant 106 by a centrifugal force so as to lubricate each slide movement portion, and a part of the lubricant is supplied from the spiral oil-feeding groove 132 to the thrust surface 184 so as to lubricate the thrust ball bearing 160.

The weight of the rotor 154 and the shaft 130 shown in FIG. 2 is supported by the thrust ball bearing 160. Since the ball 162 rolls between the upper race 166 and the lower race 168 upon rotating the shaft 130, a torque for rotating the shaft 130 becomes smaller than that of a thrust sliding bearing. For this reason, since it is possible to reduce a loss in the bearing 126, an input is reduced, thereby obtaining a high efficiency.

Next, a mechanism for restricting an abrasion, generated between the ball 162 and the lower race 168 caused by a slide between the ball 162 and the lower race 168, by regulating a rotation of the lower race 168 will be described.

It is assembled so that a center position of a rotor iron core 153 is substantially identical with that of a stator iron core 151 in a height direction.

For this reason, the thrust ball bearing 160 and the lower race 168 are applied with the weight of the shaft 130 and the rotor 154. Additionally, the thrust ball bearing 160 and the lower race 168 are interposed between the bore plane 158 of the rotor 154 and the thrust surface 184 of the bearing 126. From this point, since a friction force generated between the lower race 168 and the thrust surface 184 of the bearing 126 becomes larger than that generated between the ball 162 and the lower race 168, the lower race 168 cannot rotate. As a result, a slide is not generated between the ball 162 and the lower race 168, thereby obtaining a stable rolling of the ball 162.

Additionally, in some cases, it may be assembled such that the center position of the rotor iron core 153 is higher than the center position of the stator iron core 151 due to a non-uniform assembling operation. In this case, an adsorption force generated by the rotor 154, that is, a force for returning downward the rotor 154 is generated so that the magnetic centers are identical with each other because the magnetic center of the rotor 154 is deviated upward from that of the stator 152.

Then, the thrust ball bearing 160 and the lower race 168 are applied with the weight of the shaft 130 and the rotor 154, and are more strongly fitted between the bore plane 158 of the rotor 154 and the thrust surface 184 of the bearing 126 in terms of the force for returning downward the rotor 154. For this reason, since a friction force generated between the lower race 168 and the thrust surface 184 of the bearing 126 becomes larger than that generated between the ball 162 and the lower race 168, the lower race 168 cannot rotate.

As a result, since a slide is not generated between the ball 162 and the lower race 168, it is possible to obtain a stable rolling of the ball 162.

Additionally, in a case where it is assembled such that the center position of the rotor iron core 153 is lower than that of the stator iron core 151 in a height direction, a magnetic adsorption force generated by the rotor 154, that is, a force for drawing upward the rotor 154 is generated so that the magnetic centers are identical with each other because the magnetic center of the rotor 154 is deviated downward from that of the stator 152.

Then, to the thrust ball bearing 160 and the lower race 168 are applied the weight of the shaft 130 and the rotor 154 and are applied a force for drawing upward the rotor 154. When the force for drawing upward the rotor 154 is larger than the weight, since the friction force generated between the lower race 168 and the thrust surface 184 of the bearing 126 does not become larger than that generated between the ball 162 and the lower race 168 all the time, the lower race 168 may rotate.

As a result, since a slide is generated between the ball 162 and the lower race 168, and a stable rolling of the ball 162 is not obtained, an abrasion is caused by the slide between the ball 162 and the lower race 168.

However, in the first embodiment of the invention, the lower surface of the lower race 168 comes into contact with the thrust surface 184 of the bearing end surface 180, and the plurality of lower-race protrusion portions 190 is provided so as to protrude outward from the outer peripheral portion of the lower race 168. Likewise, since the rotation regulation portion is formed by the lower-race protrusion portion 190 and the bearing notch portion 186 for locking the lower-race protrusion portion 190 provided at the bearing end surface 180, the lower race 168 cannot rotate.

As a result, since a slide is not generated between the ball 162 and the lower race 168, a stable rolling of the ball 162 is obtained. Accordingly, since it is possible to restrict an increase of an input or an abrasion, it is possible to provide the compressor with high efficiency and reliability by restricting the increase of the input.

Then, since the lower-race protrusion portion 190 is provided at the outer peripheral portion of the lower race 168, it is possible to broaden a rolling surface of the lower race 168 on which the ball 162 rolls. Accordingly, since the stable rolling of the ball 162 is obtained and the increase of the input or the abrasion is restricted, it is possible to obtain the high reliability of the thrust ball bearing 160.

Additionally, in the bearing end surface 180 on the bearing 126, the outer peripheral wall 182 is formed on the outer-peripheral side of the bearing 126 so as to be perpendicular to the thrust surface 184.

Then, the clearance A between the outer diameter of the lower race 168 and the inner diameter of the outer peripheral wall 182 is smaller than the clearance c between the inner diameter of the lower race 168 and the outer diameter of the main shaft portion 134, the outer peripheral surface of the lower race 168 comes into contact with the inner peripheral surface of the outer peripheral wall 182 before the lower race 168 comes into contact with the main shaft portion 134. That is, in terms of the outer peripheral wall 182 surrounding the outside of the lower race 168, the inner peripheral surface of the lower race 168 is located at a position not coming into contact with the outer peripheral surface of the rotating main shaft portion 134.

Accordingly, since it is possible to regulate an excessive movement of the lower race 168 in a horizontal direction, the lower race 168 cannot damage the main shaft portion 134 to generate abrasion powder. For this reason, since it is possible to restrict the increase of the input or the abrasion, it is possible to provide the compressor with high efficiency and reliability by restricting the increase of the input.

Additionally, the height of the outer peripheral wall 182 formed in the bearing end surface 180 on the bearing 126 is set to be lower than the height of the lower race 168 and to be not lower than the height obtained by adding the height of the thrust surface 184 to a half of the plate thickness of the lower race 168.

For this reason, it is possible to prevent a case in which the lower race 168 configured to come into contact with the thrust surface 184 of the bearing 126 is located on the outer peripheral wall 182 due to a vibration generated during a transportation or an operation of the compressor to be thereby inclined. Additionally, it is possible to prevent the noise or input from increasing due to a contact between the holder portion 164 and the outer peripheral wall 182. Then, since the stable rolling of the ball 162 is obtained and the abrasion or the like of the ball 162 or the lower race 168 caused by a partial contact of the ball 162 is prevented, it is possible to provide the compressor with high efficiency and reliability.

Additionally, the bearing notch portion 186 is formed in the bearing end surface 180 so as to penetrate the outer peripheral wall 182 and the thrust surface 184, and to be deeper than the depth of the thrust surface 184 of the bearing 126.

For this reason, even when the bearing notch portion 186 is formed, the flatness degree of the thrust surface 184 of the bearing 126 is maintained and the lower race 168 is prevented from being inclined, thereby obtaining the stable rolling of the ball 162. As a result, since it is possible to prevent the increase of the input accompanied by the unstable rolling of the ball 162 or the abrasion or the like of the ball 162 and the lower race 168 caused by the partial contact of the ball 162, it is possible to provide the compressor with high efficiency and reliability.

Additionally, the lubricant 106 fed to the oil-feeding pipe 142 in terms of a centrifugal force is supplied to the thrust surface 184 via the spiral oil-feeding groove 132 provided in the outer periphery of the main shaft portion 134 so as to lubricate the thrust ball bearing 160. Since the bearing notch portion 186 is formed only on the outer peripheral side of the bearing end surface 180, the inner periphery of the bearing 126 does not communicate with the bearing notch portion 186. For this reason, it is possible to prevent a case in which the lubricant 106 fed by the oil-feeding groove 132 provided in the shaft 130 flows from the inner periphery of the bearing 126 to the outside of the slide movement portion via the bearing notch portion 186 without lubricating the thrust surface 184.

As a result, since the lubricant 106 is sufficiently supplied to the slide movement portion in the periphery of the thrust ball bearing 160, it is possible to prevent the increase of the input due to the insufficiency of the lubricant 106 and the abrasion or the like of the ball 162 and the lower race 168, and thus to provide the compressor with high efficiency and reliability.

Additionally, since the processing tolerance portion 188 is provided in the outer peripheral end of the thrust surface 184 provided on the bearing end surface 180, a convex portion is removed from the outer peripheral end of the thrust surface 184 of the bearing 126.

As a result, since it is possible to prevent a case in which the lower race 168 is located on the convex portion and the lower race 168 is inclined, it is possible to obtain the stable rolling of the ball 162. For this reason, since it is possible to prevent the increase of the input accompanied by the unstable rolling of the ball 162 and the abrasion or the like of the ball 162 and the lower race 168 caused by the partial contact of the ball 162, it is possible to provide the compressor with high efficiency and reliability.

Additionally, in the first embodiment of the invention, an exemplary embodiment has been described in which the compressing element 104 is disposed below the electric element 102 and the rotation regulation portion for regulating the rotation of the lower race 168 is provided at the bearing end surface 180 of the bearing 126 fixed to the upper portion of the cylinder block 120 forming the compressing element 104. However, it is possible to provide the compressor with high efficiency and reliability with a structure in which the compressing element 104 is disposed above the electric element 102 and the thrust ball bearing 160 is used.

Second Embodiment

Figure 6:
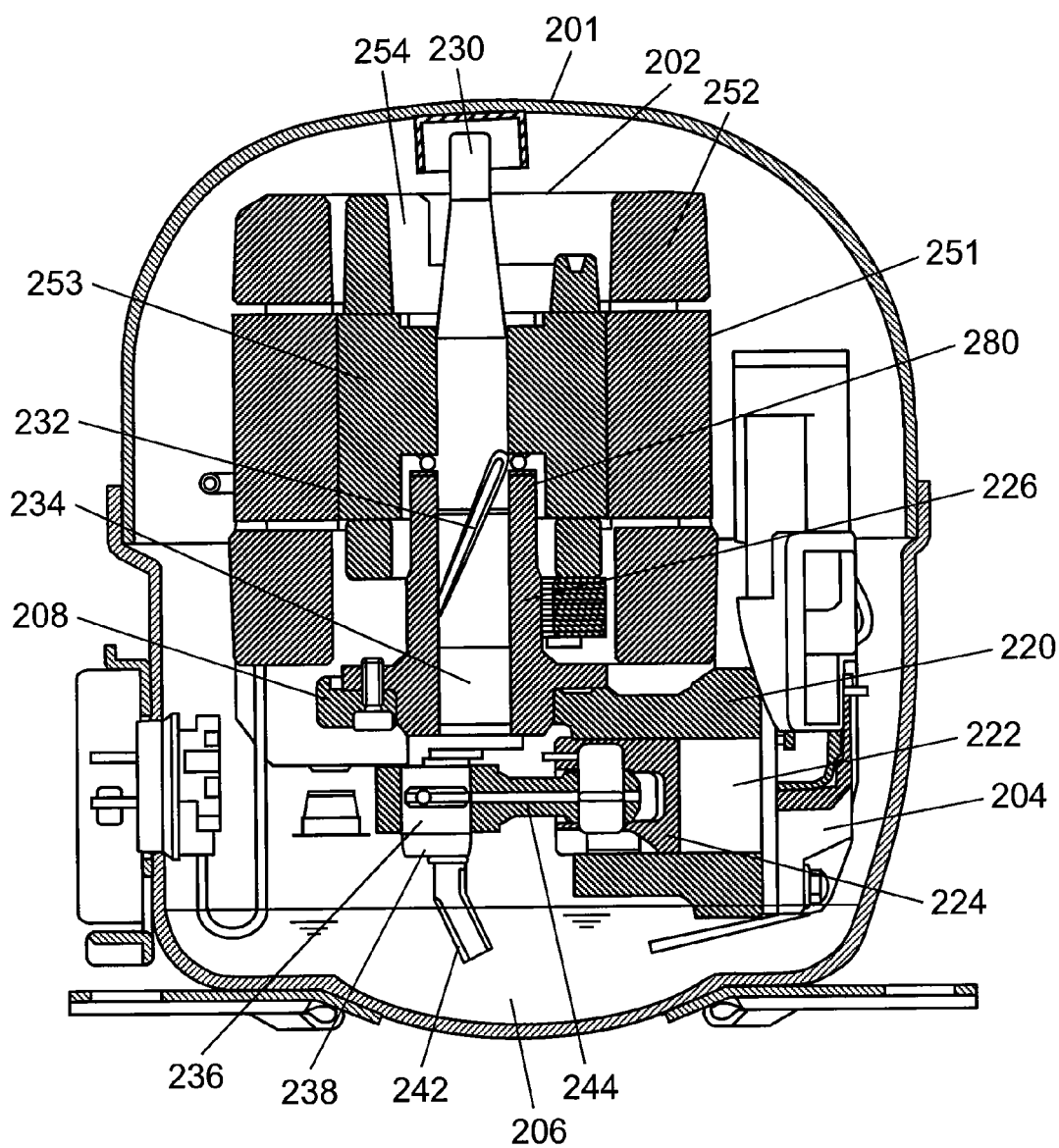
FIG. 6 is a longitudinal sectional view showing the compressor according to a second embodiment of the invention.

FIG. 6 is a longitudinal sectional view showing the compressor according to a second embodiment of the invention. A hermetic container 201 accommodates an electric element 202 including a stator 252 and a rotor 254 and a compressing element 204 rotationally driven by the electric element 202 while being disposed below the electric element 202, and a lubricant 206 is filled in a bottom portion thereof. The electric element 202 is integrally formed with the compressing element 204 to form a compression mechanism 208, and the compression mechanism 208 is elastically supported to the inside of the hermetic container 201 by a plurality of coil springs (not shown).

The compressing element 204 includes at least a shaft 230, a cylinder block 220, a piston 224, a connection mechanism 244, a bearing 226, and a thrust ball bearing 260. A cylindrical compression chamber 222 is formed in the cylinder block 220 forming the compressing element 204 so that the piston 224 reciprocates in the compression chamber 222.

The shaft 230 includes a main shaft portion 234 axially supported to the bearing 226 in a vertical direction and having a spiral oil-feeding groove 232 formed in the outer periphery and an eccentric shaft portion 236 formed therebelow. Here, the shaft 230 includes the main shaft portion 234 to which the eccentric shaft portion 236 and the rotor 254 are fixed. Additionally, the bearing 226 is provided in the cylinder block 220 so as to axially support the main shaft portion 234. The eccentric shaft portion 236 is connected to the piston 224 via the connection mechanism 244.

Additionally, a pipe-shaped oil-feeding pipe 242 is press-inserted into an oil-feeding hole (not shown) formed in a lower end 238 of the eccentric shaft portion 236 so that one end of the oil-feeding pipe 242 is communicated from the oil-feeding hole to the spiral oil-feeding groove 232.

The electric element 202 includes the stator 252 fixed to the upper portion of the cylinder block 220 and the rotor 254 fixed to the main shaft portion 234 of the shaft 230 by shrinkage fitting.

It is assembled so that a center position of a rotor iron core 253 of the rotor 254 is substantially identical with that of a stator iron core 251 of the stator 252 in a height direction.

Figure 7:
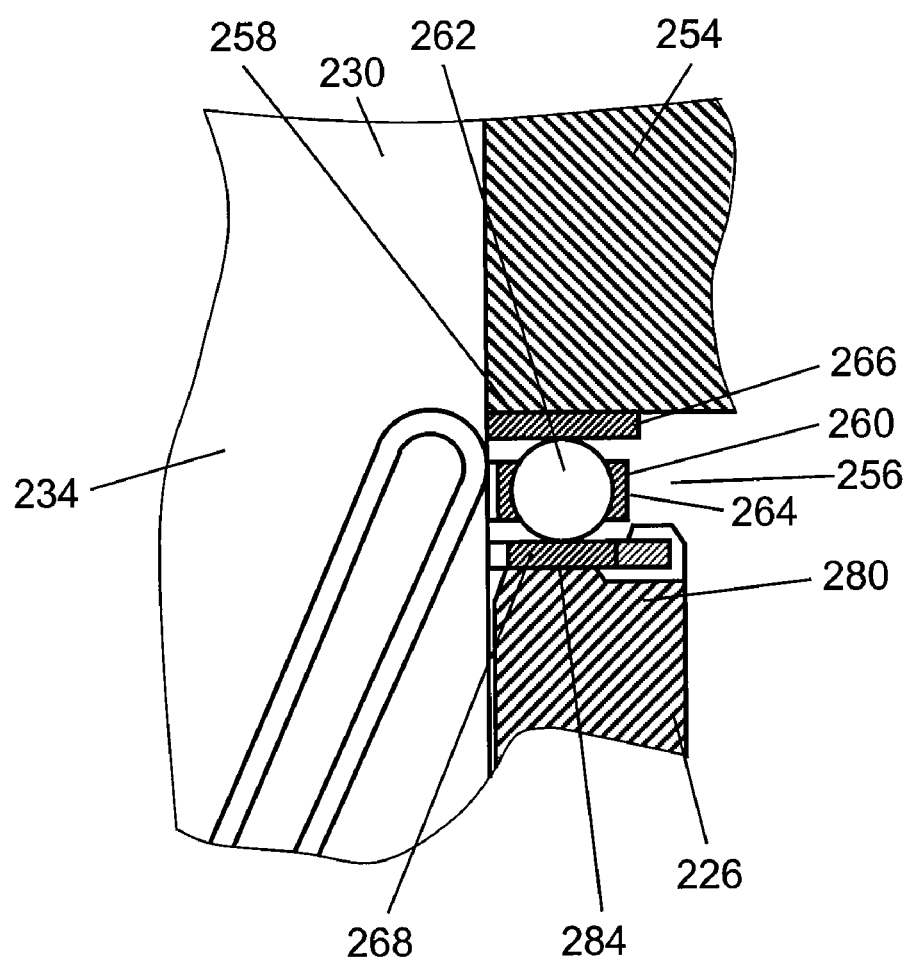
FIG. 7 is an enlarged view showing a main part of the compressor.

FIG. 7 is an enlarged view showing a main part of the compressor according to the second embodiment of the invention. A thrust ball bearing 260 is disposed between a thrust surface 284 and a bore plane 258 in a counter bore 256 as a concave portion of the rotor 254 in order to support the self weight of the shaft 230 or the rotor 254. That is, the thrust ball bearing 260 is provided between the rotor 254 and a bearing end surface 280 as an end surface of the bearing 226.

The thrust ball bearing 260 includes a plurality of balls 262, a holder portion 264 for holding the balls 262, upper and lower races 266 and 268 disposed on and beneath the balls 262, and a rotation regulation portion for regulating a rotation of the lower race 268. The upper race 266 comes into contact with the bore plane 258 of the rotor 254, and the lower race 268 comes into contact with the thrust surface 284 of the bearing 226.

Each ball 262 is made from carburized bearing steel having a high abrasion resistance property, and a surface hardness is in the range of HRC 60 to 70. Additionally, the upper race 266 and the lower race 268 each has a surface hardness larger than that of an aluminum casting forming the bearing 226 or an electromagnetic steel plate forming the rotor 254, and are made from carbon steel having a high abrasion resistance property and subjected to a heat treatment. Then, it is manufactured so that a surface hardness is in the range of HRC 58 to 68 by being subjected to hardening or the like.

Additionally, a rolling surface coming into contact with the ball 262 is not more than 30 micron in a flatness degree. A surface hardness of the ball 262 is set to be slightly larger than that of the upper race 266 and the lower race 268.

Figure 8:
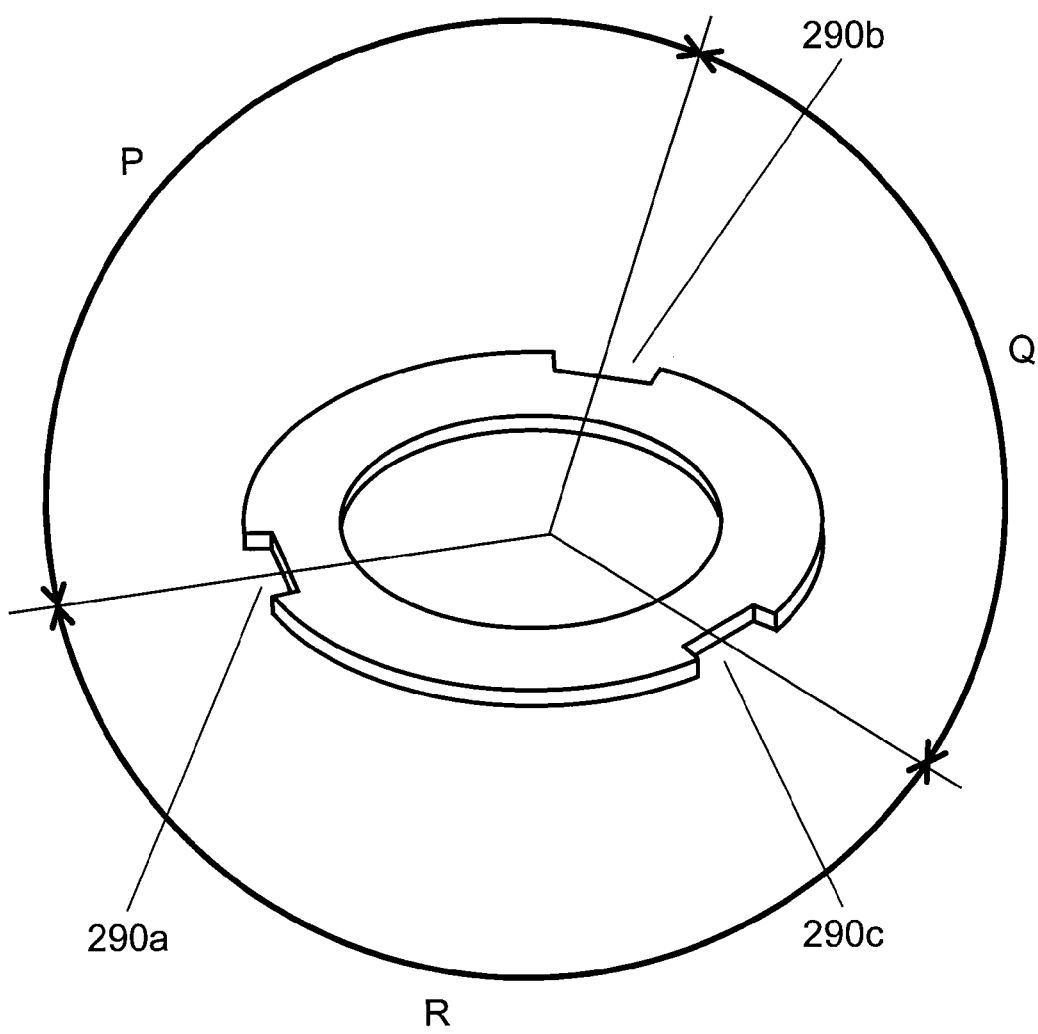
FIG. 8 is a perspective view showing a lower race of the compressor.

FIG. 8 is a perspective view showing a lower race of the compressor according to the second embodiment of the invention. The lower race 268 includes lower-race notch portions 290a, 290b, and 290c.

Figure 9:
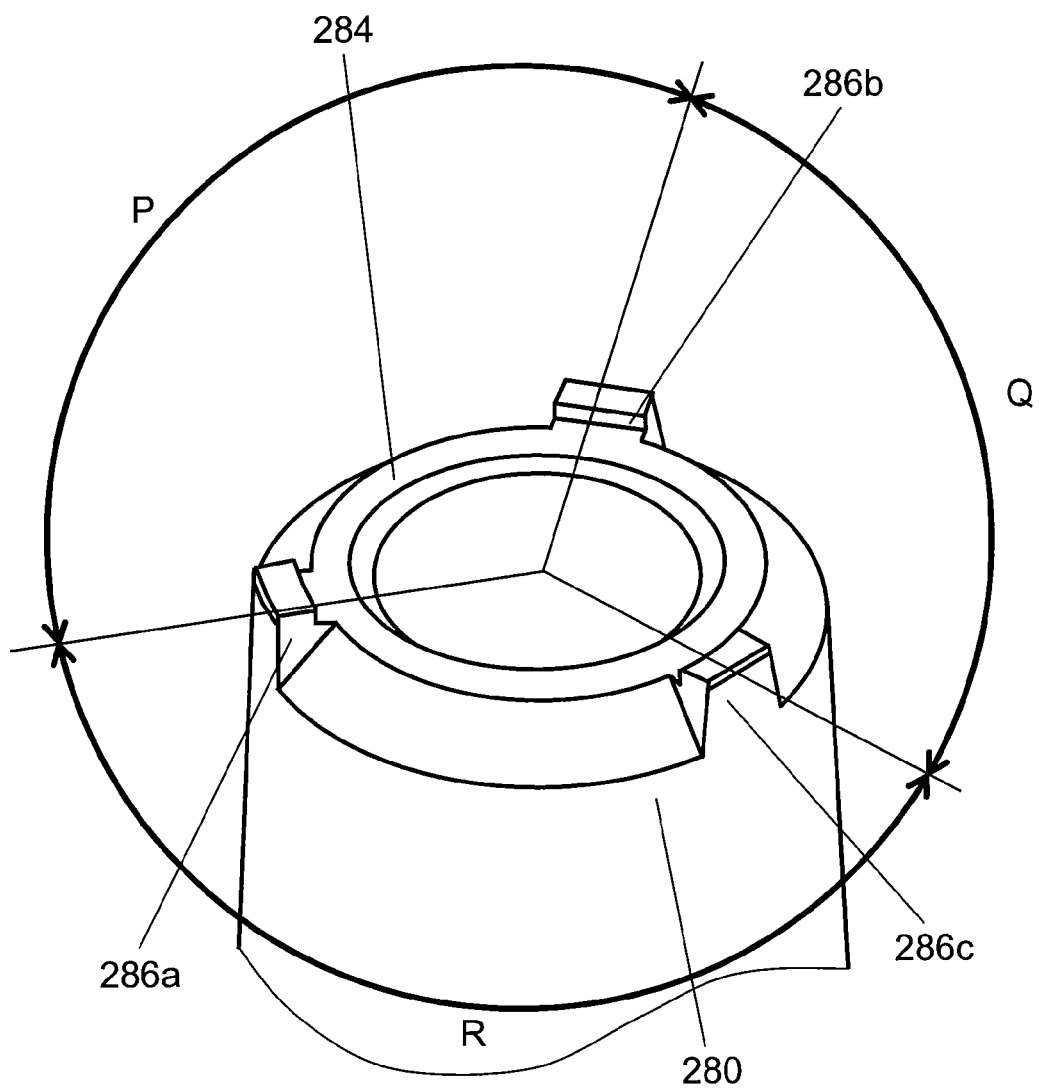
FIG. 9 is an enlarged perspective view showing a bearing end surface of the compressor.
Figure 10:
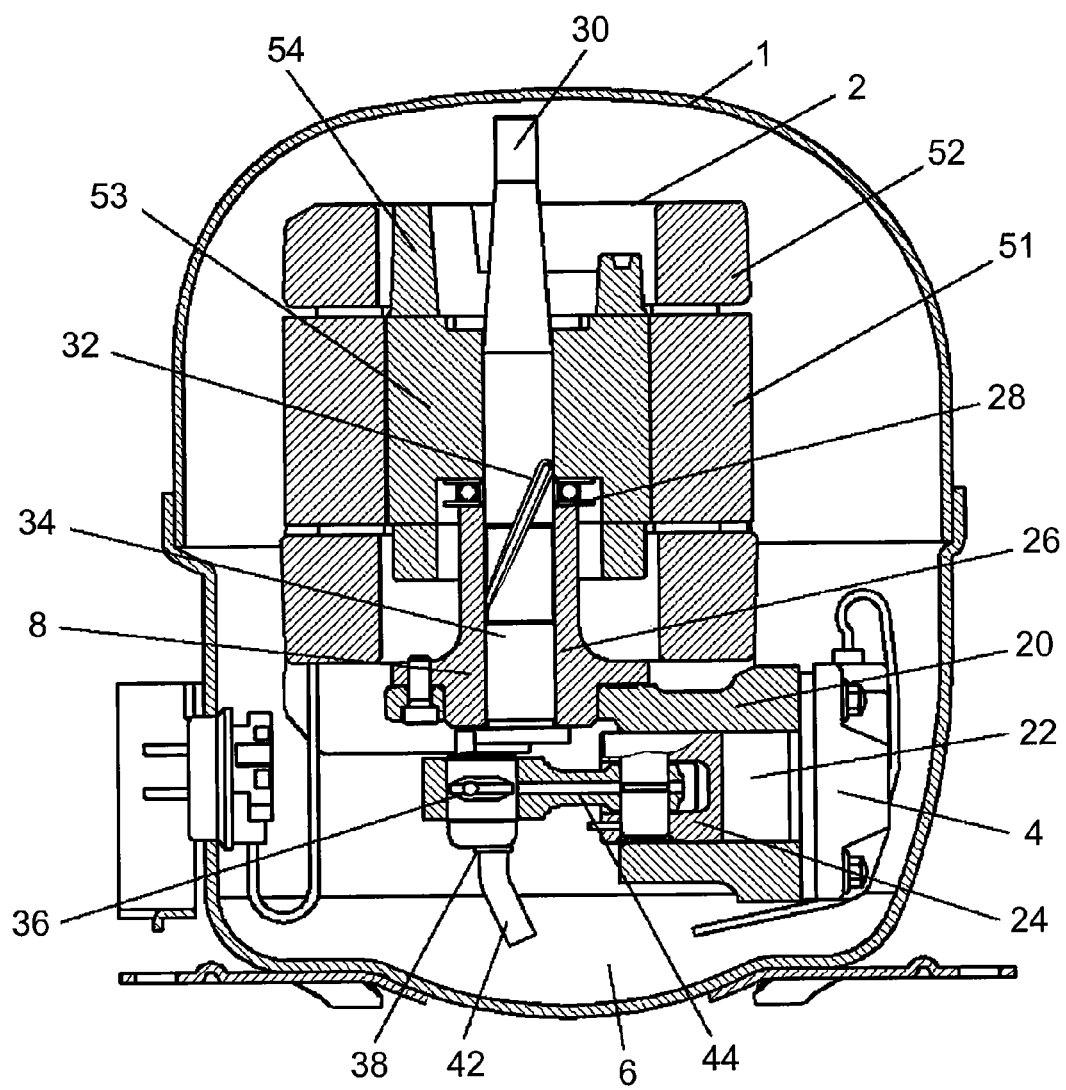
FIG. 10 is a longitudinal sectional view showing a general compressor.
Figure 11:
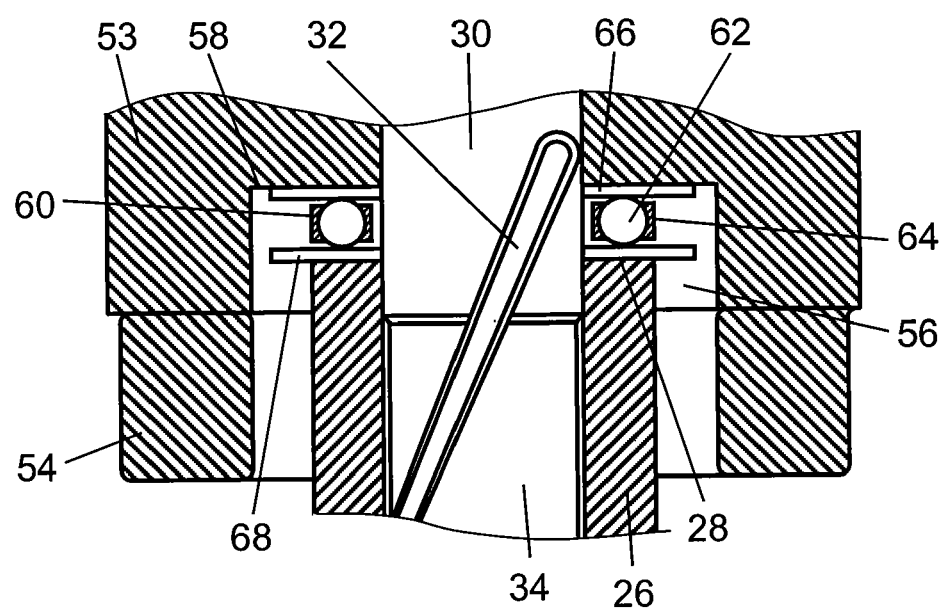
FIG. 11 is an enlarged view showing a main part of the compressor.

FIG. 9 is an enlarged perspective view showing a bearing end surface of the compressor according to the second embodiment of the invention. A plurality of bearing protrusion portions 286a, 286b, and 286c are formed in the outer peripheral portion of the bearing end surface 280 on the bearing 226 in a longitudinal direction of the bearing 226. The thrust surface 284 is formed in a direction perpendicular to the bearing protrusion portions 286a, 286b, and 286c extending in a longitudinal direction of the bearing 226. Herein, the bearing protrusion portions 286a, 286b, and 286c regulate the movement of the lower race 268 in an outer peripheral direction.

The bearing protrusion portions 286a, 286b, and 286c are formed at non-equiangular positions of the bearing 226 in a circumferential direction by processing or die-casting. The non-equiangular positions are defined as $P \neq Q \neq R$, where an angle formed between the bearing protrusion portion 286a and the bearing protrusion portion 286b, an angle formed between the bearing protrusion portion 286b and the bearing protrusion portion 286c, and an angle formed between the bearing protrusion portion 286c and the bearing protrusion portion 286a are denoted by P, Q, and R, respectively.

Additionally, the lower race 268 shown in FIG. 8 is installed so that its lower surface comes into contact with the thrust surface 284 of the bearing end surface 280. Lower-race notch portions 290a, 290b, and 290c are provided in the lower race 268 so as to correspond to the bearing protrusion portions 286a, 286b, and 286c in a circumferential direction. Then, the bearing protrusion portions 286a, 286b, and 286c and the lower-race notch portions 290a, 290b, and 290c locked to the bearing protrusion portions 286a, 286b, and 286c form a rotation regulation portion.

Hereinafter, an operation and effect of the compressor with the above-described configuration will be described.

When a current is supplied from an external power source (not shown) to the electric element 202 shown in FIG. 6, the rotor 254 rotates. Subsequently, the shaft 230 rotates, rotation motion of the eccentric shaft portion 236 is transmitted to the piston 224 via the connection mechanism 244, and then the piston 224 reciprocates in the compression chamber 222, thereby enabling the compressing element 204 to perform a predetermined compression operation.

Accordingly, a refrigerant gas is sucked from a refrigeration system (not shown) into the compression chamber 222 to be compressed therein, and is again discharged to the refrigeration system.

At this time, the oil-feeding pipe 242 feeds the lubricant 206 by a centrifugal force so as to lubricate each slide movement portion, and a part of the lubricant is supplied from the spiral oil-feeding groove 232 to the thrust surface 284 so as to lubricate the thrust ball bearing 260.

The weight of the rotor 254 and the shaft 230 shown in FIG. 7 is supported by the thrust ball bearing 260. Since the ball 262 rolls between the upper race 266 and the lower race 268 upon rotating the shaft 230, a torque for rotating the shaft 230 becomes smaller than that of a thrust sliding bearing. For this reason, since it is possible to reduce a loss in the bearing 226, an input is reduced, thereby obtaining a high efficiency.

Next, a mechanism for restricting an abrasion, generated between the ball 262 and the lower race 268 caused by a slide between the ball 262 and the lower race 268, by regulating a rotation of the lower race 268 will be described.

It is assembled so that the center position of the rotor iron core 253 is substantially identical with that of the stator iron core 251 in a height direction.

For this reason, to the thrust ball bearing 260 and the lower race 268 are applied the weight of the shaft 230 and the rotor 254. Additionally, the thrust ball bearing 260 and the lower race 268 are interposed between the bore plane 258 of the rotor 254 and the thrust surface 284 of the bearing 226. From this point, since a friction force generated between the lower race 268 and the thrust surface 284 of the bearing 226 becomes larger than that generated between the ball 262 and the lower race 268, the lower race 268 cannot rotate. As a result, a slide is not generated between the ball 262 and the lower race 268, thereby obtaining a stable rolling of the ball 262.

Additionally, in some cases, it may be assembled such that the center position of the rotor iron core 253 is higher than the center position of the stator iron core 251 due to a non-uniform assembling operation. In this case, an magnetic attractive force generated by the rotor 254, that is, a force for returning downward the rotor 254 is generated so that the magnetic centers are identical with each other because the magnetic center of the rotor 254 is deviated upward from that of the stator 252.

Then, to the thrust ball bearing 260 and the lower race 268 are applied the weight of the shaft 230 and the rotor 254, and are more strongly fitted between the bore plane 258 of the rotor 254 and the thrust surface 284 of the bearing 226 by the force for returning downward the rotor 254. For this reason, since a friction force generated between the lower race 268 and the thrust surface 284 of the bearing 226 becomes larger than that generated between the ball 262 and the lower race 268, the lower race 268 cannot rotate.

As a result, since a slide is not generated between the ball 262 and the lower race 268, it is possible to obtain a stable rolling of the ball 262.

Additionally, in a case where it is assembled such that the center position of the rotor iron core 253 is lower than that of the stator iron core 251 in a height direction, a magnetic attractive force generated by the rotor 254, that is, a force for drawing upward the rotor 254 is generated so that the magnetic centers are identical with each other because the magnetic center of the rotor 254 is deviated downward from that of the stator 252.

Then, to the thrust ball bearing 260 and the lower race 268 are applied with the weight of the shaft 230 and the rotor 254 and are applied a force for drawing upward the rotor 254. When the force for drawing upward the rotor 254 is larger than the weight, since the friction force generated between the lower race 268 and the thrust surface 284 of the bearing 226 does not become larger than that generated between the ball 262 and the lower race 268 all the time, the lower race 268 may rotate.

As a result, since a slide is generated between the ball 262 and the lower race 268, and a stable rolling of the ball 262 is not obtained, an abrasion is caused by the slide between the ball 262 and the lower race 268.

However, in the second embodiment of the invention, the lower surface of the lower race 268 comes into contact with the thrust surface 284 of the bearing end surface 280, and the lower-race notch portions 290*a*, 290*b*, and 290*c* are provided at positions corresponding to the bearing protrusion portions 286*a*, 286*b*, and 286*c*. Then, since the rotation regulation portion locked to bearing protrusion portions 286*a*, 286*b*, and 286*c* are provided at positions corresponding to the lower-race notch portions 290*a*, 290*b*, and 290*c*, the lower race 268 cannot rotate.

As a result, since a slide is not generated between the ball 262 and the lower race 268, a stable rolling of the ball 262 is obtained. Accordingly, since it is possible to restrict an increase of an input or an abrasion, it is possible to provide the compressor with high efficiency and reliability by restricting the increase of the input.

Then, since the lower race 268 is provided with the notch portions 290*a*, 290*b*, and 290*c*, it is possible to additionally reduce a blank material amount upon punching the lower race 268 using a press, and thus to restrict a material cost of the lower race 268.

Additionally, the bearing protrusion portions 286*a*, 286*b*, and 286*c* and the lower-race notch portions 290*a*, 290*b*, and 290*c* are formed at the same non-equiangular positions of the bearing 226 and the lower race 268 in a circumferential direction, respectively. For this reason, upon combining the bearing protrusion portions 286*a*, 286*b*, and 286*c* with the lower-race notch portions 290*a*, 290*b*, and 290*c*, the assembling operation needs to be carried out such that one determined surface of the lower race 268 is used as a surface necessarily coming into contact with the ball 262.

As a result, since it is necessary to just ensure a surface roughness of at least one surface of the lower race 268 coming into contact with the ball 262, it is possible to simplify a manufacture process of the lower race 268. Accordingly, it is possible to reduce a manufacture cost and to improve productivity.

Additionally, before the lower race 268 contacts with the main shaft portion 234, at least one of the combinations between the lower-race notch portions 290*a*, 290*b*, and 290*c* and the bearing protrusion portions 286*a*, 286*b*, and 286*c* contacts with each other. That is, in terms of the bearing protrusion portions 286*a*, 286*b*, and 286*c*, the inner peripheral surface of the lower race 268 is disposed at a position not contacting with the outer peripheral surface of the rotating main shaft portion 234.

Accordingly, since it is possible to regulate the excessive movement of the lower race 268 in a horizontal direction, the lower race 268 cannot damage the main shaft 234 to generate abrasion powder. For this reason, since it is possible to restrict the increase of the input or the abrasion, it is possible to provide the compressor with high efficiency and reliability by restricting the increase of the input.

Additionally, in the second embodiment of the invention, an exemplary embodiment has been described in which the compressing element 204 is disposed below the electric element 202 and the rotation regulation portion for regulating the rotation of the lower race 268 is provided at the bearing end surface 280 of the bearing 226 fixed to the upper portion of the cylinder block 220 forming the compressing element 204. However, it is possible to obtain the same advantage with a structure in which the compressing element 204 is disposed above the electric element 202 and the thrust ball bearing 260 is used.

Additionally, in the first embodiment of the invention, the lower-race protrusion portion 190 and the bearing notch portion 186 may be formed at the same non-equiangular positions of the lower race 168 and the bearing 126 in a circumferential direction, respectively. For this reason, upon combining the lower-race protrusion portion 190 with the bearing notch portion 186, the assembling operation needs to be carried out such that one determined surface of the lower race 168 is used as a surface necessarily coming into contact with the ball 162.

As a result, since it is necessary to just ensure a surface roughness of at least one surface of the lower race 168 coming into contact with the ball 162, it is possible to simplify a manufacture process of the lower race 168. Accordingly, it is possible to reduce a manufacture cost and to improve productivity.

Industrial Applicability

As described above, since the compressor according to the invention includes the rotation regulation portion for regulating the rotation of the lower race, it is possible to provide the compressor with high efficiency and reliability by restricting the increase of the input, which may be applied to a vending machine, a freezer showcase, a dehumidifier, and the like.

The invention claimed is:

1. A compressor comprising a hermetic container which comprises:
a lubricant;
an electric element provided with a stator and a rotor; and
a compressing element driven by the electric element,
wherein the compressing element comprises:
a shaft provided with an eccentric shaft portion and a main shaft portion to which the rotor is fixed;
a cylinder block provided with a compression chamber;
a piston reciprocating in the compression chamber;
a connection mechanism connecting the piston to the eccentric shaft portion;
a bearing provided at the cylinder block to axially support the main shaft portion; and
a thrust ball bearing provided between the rotor and a bearing end surface of the bearing,
wherein the thrust ball bearing comprises:
a plurality of balls; and
a lower race being placed on a thrust surface of the bearing end surface for rotational contact with the balls, wherein
the lower race has at least one protrusion extending radially from an outer periphery of the lower race, and the bearing end surface has at least one notch that is formed deeper than the thrust surface and engages with the at least one protrusion to regulate rotational movement of the lower race relative to the thrust surface, and
the at least one notch is provided at an outer peripheral side of the bearing end surface so as not to communicate with an inner peripheral portion of the bearing.

2. The compressor according to claim 1, wherein the bearing end surface is provided with an axially elevating wall along an outer periphery of the bearing end surface which regulates a radial movement of the lower race on the thrust surface.

3. The compressor according to claim 2, wherein the wall elevates at a height measured from the thrust surface which is lower than a plate thickness of the lower race and not less than a half of the plate thickness of the lower race.

4. The compressor according to claim 1, wherein there are more than one protrusion formed radially from the lower race at irregular angular intervals, and there are a corresponding number of the notches formed in the bearing end surface at corresponding angular intervals.

5. The compressor according to claim 1, wherein a processing tolerance portion is provided at an outer peripheral end of the thrust surface.

6. The compressor according to claim 5, wherein the processing tolerance portion is a circular groove having an inclined surface.

7. A compressor comprising a hermetic container which comprises:
a lubricant;
an electric element provided with a stator and a rotor; and
a compressing element driven by the electric element,
wherein the compressing element comprises:
a shaft provided with an eccentric shaft portion and a main shaft portion to which the rotor is fixed;
a cylinder block provided with a compression chamber;
a piston reciprocating in the compression chamber;
a connection mechanism connecting the piston to the eccentric shaft portion;
a bearing provided at the cylinder block to axially support the main shaft portion; and
a thrust ball bearing provided between the rotor and a bearing end surface of the bearing, and wherein the thrust ball bearing comprises:
a plurality of balls; and
a lower race being placed on a thrust surface of the bearing end surface for rotational contact with the balls, wherein the bearing end surface has at least one protrusion extending axially from an outer periphery of the bearing end surface, and the lower race has at least one notch formed at an outer periphery of the lower race that engages with the at least one protrusion to regulate rotational movement of the lower race relative to the thrust surface.

8. The compressor according to claim 7, wherein the at least one protrusion formed at the outer peripheral portion of the bearing end surface is configured to regulate a radial movement of the lower race on the thrust surface.

9. The compressor according to claim 7, wherein there are more than one protrusion extending axially from the bearing end surface at irregular angular intervals, and there are a corresponding number of notches formed at the outer periphery of the lower race at corresponding angular intervals.

10. A compressor comprising a hermetic container which comprises:
a lubricant;
an electric element provided with a stator and a rotor; and
a compressing element driven by the electric element,
wherein the compressing element comprises:
a shaft provided with an eccentric shaft portion and a main shaft portion to which the rotor is fixed;
a cylinder block provided with a compression chamber;
a piston reciprocating in the compression chamber;
a connection mechanism connecting the piston to the eccentric shaft portion;
a bearing provided at the cylinder block to axially support the main shaft portion; and
a thrust ball bearing provided between the rotor and a bearing end surface of the bearing,
wherein the thrust ball bearing comprises:
a plurality of balls; and
a lower race being placed on a thrust surface of the bearing end surface for rotational contact with the balls, wherein
the lower race has a plurality protrusions extending radially from an outer periphery of the lower race at irregular angular intervals, and the bearing end surface has a corresponding number of notches at corresponding angular intervals to engage with the plurality of protrusions in order to regulate rotational movement of the lower race relative to the thrust surface, and the plurality of notches are provided at an outer peripheral side of the bearing end surface so as not to communicate with an inner peripheral portion of the bearing.

11. A compressor comprising a hermetic container which comprises:
a lubricant;
an electric element provided with a stator and a rotor; and
a compressing element driven by the electric element, wherein the compressing element comprises:
 a shaft provided with an eccentric shaft portion and a main shaft portion to which the rotor is fixed;
 a cylinder block provided with a compression chamber;
 a piston reciprocating in the compression chamber;
 a connection mechanism connecting the piston to the eccentric shaft portion;
 a bearing provided at the cylinder block to axially support the main shaft portion; and
 a thrust ball bearing provided between the rotor and a bearing end surface of the bearing, and wherein the thrust ball bearing comprises:
 a plurality of balls; and
 a lower race being placed on a thrust surface of the bearing end surface for rotational contact with the balls, wherein the bearing end surface has a plurality of protrusions extending axially from an outer periphery of the bearing end surface at irregular angular intervals, and the lower race has a corresponding number of notches formed at an outer periphery of the lower race at corresponding angular intervals to engage with the plurality of protrusions in order to regulate rotational movement of the lower race relative to the thrust surface.

* * * * *